May 19, 1964

R. D. McDONALD 3,133,900

BISPHENOL-ETHER-FORMALDEHYDE RESINS

Filed June 11, 1959

ROLAND D. McDONALD
INVENTOR.

BY
HIS ATTORNEY patented May 19, 1964

3,133,900
BISPHENOL-ETHER-FORMALDEHYDE RESINS
Roland D. McDonald, Niagara Falls, N.Y., assignor, by mesne assignments, to Reichhold Chemicals, Inc., a corporation of Delaware
Filed June 11, 1959, Ser. No. 819,697
5 Claims. (Cl. 260—52)

This invention relates to synthetic resins and more particularly to resins formed from a bisphenol, a halogenated ether and an aldehyde, and to a method of producing such resins.

One object of the present invention is to provide a resin that will cure by heat to a film having a high degree of flexibility without the inclusion therein of a plasticizer. Another object is the provision of a resin that strongly adheres to other materials, particularly to metals, when cured, and one which does not impart a taste or flavor to foodstuff held in intimate contact therewith for extended periods of time. Still another object of the present invention is the provision of a resin that can be cured to the irreversible and insoluble state by heat. Other objects may be discerned from the following disclosure.

The method of preparing a resin according to the present invention is characterized by the choice of a molal ratio of bisphenol to dihalide such that the terminal groups in the intermediate resin are phenol groups and by the sequence of steps whereby the chosen polyhydric phenol and the chosen dichlor ether are first reacted to produce a resinous product and then the thus formed resinous product is caused to react with a chosen aldehyde to produce the ultimate uncured but heat curable resin. The molal ratio of bisphenol to dihalide must be greater than 1:1 and preferably is 2:1.

Figure 1:
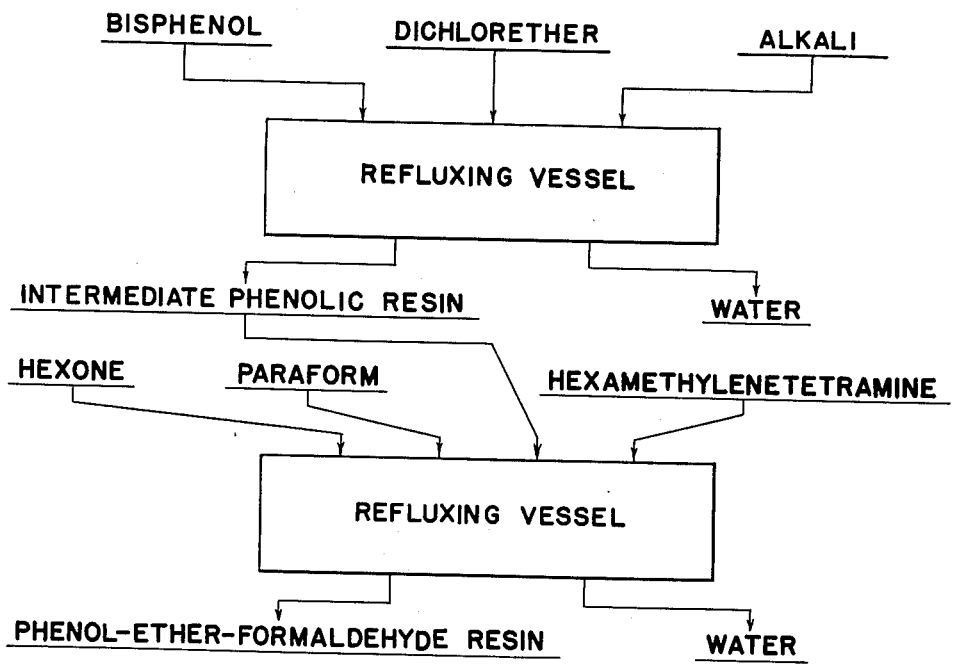
Figure 2:
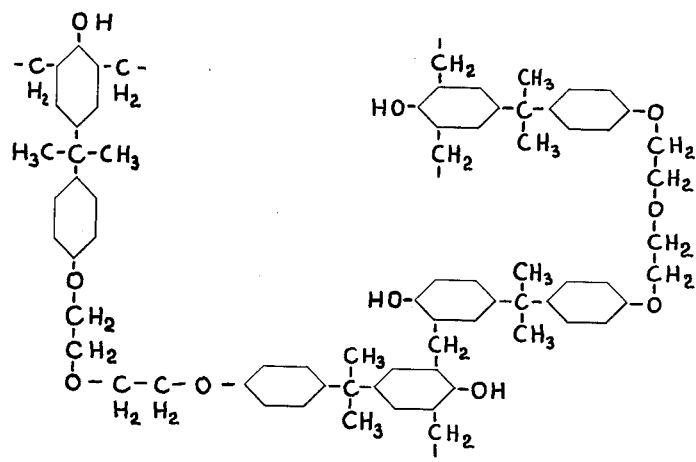

In the drawings, FIGURE 1 is a diagrammatic representation of a method by which this invention is carried out, and FIGURE 2 is a graphic formula illustrating a resin of the present invention after that resin has been heat cured; for example, at a temperature of 400° F. for 15 minutes.

The resin illustrated in FIGURE 2 is one representing the product obtained by reacting formaldehyde and the intermediate phenol resin obtained by reacting a two-to-one mol ratio of bisphenol A and dichlorethylether, after the bisphenol - dichlorethyletherformaldehyde reaction product has been heat cured. Actually the graphic formula illustrated is not strictly correct because some of the nitrogen from the catalyst certainly is present in the compound, but its omission from the formula is immaterial to the present purpose of the formula.

The unsatisfied valence lines shown in the formula indicate that the structure goes on indefinitely, and naturally the structure would have to be three dimensional.

Among the phenols that are suitable for use in the present invention are di(4-hydroxyphenyl)dimethylmethane, 1,1-di(4-hydroxyphenyl)-2-ethylbutane, di(4-hydroxyphenyl)methylethylmethane, di(4-hydroxyphenyl)methylmethane, di(4-hydroxyphenyl)propylmethane, di(2-hydroxyphenyl) dimethylmethane, di (4 - hydroxyphenyl) phenylmethane and di(4-hydroxyphenyl)cyclohexane. A general description of polyhydric phenols suitable for use in practicing this invention is that they are di(hydroxyphenyl)alkanes in which the hydroxy groups are in either the 2 or 4 positions in the benzene rings.

Suitable halogenated ethers are aliphatic dihalides in which the molecule contains at least one ether group and in which each halogen atom is attached to a carbon atom in a different alkyl group, each of such alkyl groups having at least two carton atoms and the alkyl groups being separated by the ether oxygen atom.

In the preferred embodiment of this invention, 1824 grams (8 mols) of di(4-hydroxyphenyl)dimethylmethane, hereinafter sometimes referred to as bisphenol A, 572 grams (4 mols) of β,β' dichlorodiethyl ether, hereinafter sometimes referred to as dichlor ether A, and 1184 grams of water are first brought to a gentle boil in a refluxing vessel. Then a solution of 320 grams (8 mols) of sodium hydroxide in 320 grams of water is slowly added to the said gently boiling mixture of bisphenol A and dichlor ether A while the mixture is kept boiling. Refluxing is continued for 20 hours after all of the sodium hydroxide has been added, when approximately 95% of the sodium hydroxide will have been neutralized. Sufficient hydrochloric acid is then added to complete the neutralization of the sodium hydroxide and to render the batch slightly acid.

During the refluxing, the reaction product resin and water separate into two phases. When the refluxing has been completed and the batch acidified, the water is drawn off and the resinous product is washed repeatedly with boiling water to remove the salt therefrom. It is then heated to 150° C. at atmospheric pressure to remove the water. This procedure results in a yield of about 99% of the theoretical of a light colored, low melting resinous phenol, hereinafter sometimes referred to as intermediate phenolic resin A.

To complete the production of the preferred resin of this invention 500 grams of intermediate phenolic resin A, made in the manner described above, are thinned with 87.5 grams of methylisobutyl ketone (hexone) and reacted with 75 grams of flake paraformaldehyde (hereinafter sometimes referred to as paraform) in the presence of 15 grams of the catalyst hexamethylenetetramine, which has been dissolved in 68 grams of water and added as a solution, all of which is heated in a refluxing vessel for 2 hours. At this point the viscosity of the mixture will have increased substantially, and should be reduced by the addition of 87.5 grams of hexone before being refluxed a further 2 hours. After said further refluxing for 2 hours, 75 grams of hexone are added and the batch refluxed at reduced pressure through a separator to remove the water. When dry, this reaction product can be thinned with hexone to approximately 65% solids. This resin solution can then be further thinned with any appropriate lacquer solvent to produce a resin lacquer of the desired solids content, for example about 35% solids.

Such lacquer, when flowed onto tin-plate panels and baked for 15 minutes at a temperature of 400° F., produces an exceptionally flexible golden film that adheres tenaciously to the said tin-plate.

In the foregoing example, the intermediate phenolic resin A was reacted with paraform in the presence of hexamethylenetetramine as a catalyst. Other catalysts selected from the group consisting of ammonia, primary aliphatic amines, secondary aliphatic amines, tertiary aliphatic amines and primary arylamines can be used to catalyze the reaction. Specific examples are ammonium hydroxide, dimethylamine, tetramethylamine, ethylene diamine, aniline and triethanolamine. Strong alkalies, such as sodium hydroxide, barium hydroxide and chloline will catalyze the reaction but produce less flexible films than those mentioned above.

Of the foregoing catalysts, dimethylamine is preferred because it is an efficient one and permits a shorter cycle during the process of making the resin and produces a faster curing resin. When cured at 400° F. for ten minutes, the resin film is similar to that produced when hexamethyltetramine has been used as the catalsyt in that it is golden colored, mar resistant, very flexible, solvent resistant and taste free.

Another modification of the above procedure that results in an exceptionally flexible film from a lacquer is to use isophorone (3,5,5 trimethyl-2-cyclohexenone) in place of hexone during the refluxing of the intermediate phenolic resin A with paraform and hexamethylenetetramine and then, when the resin has been dehydrated by heating to 100° C. under 27.5 inches of vacuum, using hexone to adjust the solids to 65%. Further thinning is accomplished by the use of appropriate lacquer solvents.

Intermediate phenolic resin A can be reacted with formaldehyde instead of with paraform to produce a resin that forms a very flexible film from its lacquer by the following procedure. Five hundred grams of intermediate phenolic resin A are cut with 87.5 grams of hexone and 187.5 grams of aqueous 37% formaldehyde and 15 grams of 25% dimethylamine are added thereto and the whole refluxed for 5 hours. After adding 87.5 grams more of hexone, the refluxing is continued for an additional 2 hours, when a further addition of 75 grams of hexone is made and the batch is refluxed under a vacuum of 15 to 20 inches through a separator to remove the water. Upon adjusting the solids to 65% with hexone, and a further thinning with any appropriate lacquer solvent to reduce the solids to about 35%, a lacquer results which, when applied to tin-plated panels and baked at 400° F. for 15 minutes, is very flexible and adheres well to the tin-plate.

The intermediate phenolic resin A also can be made by substituting 8 mols of potassium hydroxide for the 8 mols of sodium hydroxide used in the previously described method of making it.

An intermediate phenolic resin differing somewhat from that designated hereinabove as intermediate phenolic resin A results when the proportions of bisphenol A and dichlor ether A reacted are changed to, for example, 1368 grams (6 mols) of bisphenol A and 572 grams (4 mols) of dichlor ether A. In carrying out this modification of the invention the bisphenol A and dichlor ether A, together with 1184 grams of water, are brought to a gentle boil and maintained in that condition while 320 grams (8 mols) of sodium hydroxide dissolved in 320 grams of water are fed slowly into the mixture. Refluxing is continued for 18 hours, at which time 95% of the sodium hydroxide will have reacted. The batch is then acidified with hydrochloric acid and washed repeatedly with hot water to remove the salt, after which it is dried by heating to 150° C. The yield is 100% of theoretical or 1648 grams in this instance.

The resinous phenol thus formed and hereinafter sometimes referred to as intermediate phenolic resin A' is then dissolved in 288 grams of hexone to which 165 grams of paraform and 33 grams of dimethylamine (25%) are added and the whole refluxed for 4½ hours. Then an additional 288 grams of hexone are added and the refluxing is continued for a further period of 4 hours, after which 248 grams of hexone are added and the batch is refluxed at reduced pressure through a separator to remove the water, and finished at 80° C. in a vacuum of 21 inches. Reduced with appropriate lacquer solvent to provide a lacquer containing about 35% solids and coated onto tinned sheets and baked for 15 minutes at 400° F., this resin resulted in an exceptionally flexible film.

Instead of using dichloro-ether to produce the intermediate phenolic resin, as has been the case in the foregoing examples, triglycoldichloride can be used to react with the bisphenol. Eight mols (1824 grams) of bisphenol A, four mols (748 grams) of triglycoldichloride and 1184 grams of water are brought to a gentle boil in a refluxing vessel and so maintained while 320 grams of sodium hydroxide dissolved in 320 grams of water are slowly fed into the batch. When the refluxing has been continued for 24 hours, 95% of the sodium hydroxide will have been used up whereupon the batch is neutralized with hydrochloric acid, washed thoroughly with boiling water and dried at 150° C. The entire yield (2263 grams or 99% of theoretical) of intermediate phenolic resin thus produced and hereinafter sometimes referred to as intermediate phenolic resin B is then thinned with 365 grams of hexone, mixed with 314 grams of paraform and 64 grams of hexamethylenetetramine dissolved in 256 grams of water and the whole batch refluxed for 6 hours. After the further addition of 365 grams of hexone, the refluxing is continued for 3½ hours and followed by an addition of 401 grams of hexone and refluxing at reduced pressure through a separator to remove the water. On reaching a temperature of 86° C. at a vacuum of 17½ inches the batch is sufficiently free of water to be diluted with additional hexone to adjust the proportion of solids to 65%. A film of a lacquer thinned to about 35% solids in an appropriate lacquer solvent applied to a tinned plate and heated to 400° F. for 15 minutes is extremely flexible.

Another embodiment of the invention results from the reaction of 456 grams (2 mols) of bisphenol A with 171 grams (1 mol) of dichlorisopropylether. This reaction is carried out by mixing the said bisphenol and the said ether with 296 grams of water and bringing the batch to a gentle boil in a refluxing vessel. Sodium hydroxide solution made by dissolving 80 grams (2 mols) of sodium hydroxide in 80 grams of water is then added to the batch over a period of about 10 minutes. Refluxing the batch for 100 hours results in neutralization of most of the sodium hydroxide. Dilute hydrochloric acid is used to complete the neutralization and to leave the batch slightly acidic, after which boiling water is used to wash the resinous material until it is free from salt.

The foregoing phenolic resin, hereinafter sometimes identified as intermediate phenolic resin C, is then thinned with hexone, and reacted with paraform in the presence of dimethylamine as a catalyst. This batch, proportioned as follows, namely, 500 grams of intermediate phenolic resin C, 87.5 grams of hexone, and 75 grams of paraform, is refluxed for 2 hours and then thinned with 87.5 grams more hexone before being refluxed an additional 30 minutes. After the addition of a further 75 grams of hexone, the batch is refluxed at reduced pressure through a separator to remove the water and then heated to 86° C. at a vacuum of 20½ inches. A lacquer formed of about 35% of the foregoing resin and 65% of an appropriate lacquer solvent provides a baked film more flexible than conventional phenolic aldehyde resins, but less flexible than that provided by the first example of this disclosure.

Other bisphenols than bisphenol A can be used to react with a dichlor ether to produce an intermediate phenolic resin that is reactive with an aldehyde to form a heat-settable resin that is very flexible in film form. One such bisphenol is 1,1-di(4-hydroxyphenyl)-2-ethylbutane.

An intermediate phenolic resin is made by forming a batch containing 135 grams (½ mol) of 1,1-di(4-hydroxyphenyl)-2-ethylbutane, 135 grams of water and 36 grams of dichlorethyl ether and bringing it to a boil. Twenty grams of sodium hydroxide dissolved in 60 grams of water, is then slowly added after which the whole charge is refluxed for 32 hours. The residual sodium hydroxide is then neutralized with hydrochloric acid. The batch is then washed repeatedly with boiling water, after which the water is removed by heating the batch to 150° C. The yield of intermediate resin is 99% theoretical.

The intermediate phenolic resin thus produced (152 grams), and hereinafter sometimes referred to as intermediate phenolic resin D, is cut with 27 grams of hexone and refluxed with 23 grams of paraform and 3 grams of 25% dimethylamine for 2 hours. Then an additional 27 grams of hexone are added and the refluxing continued for 6 hours. The resulting resin is cut with 23 grams of hexone and refluxed at a reduced pressure through a separator to remove the water, after which a lacquer containing 65% solids is made by adding sufficient hexone. Further thinning is accomplished by the use of an appropriate lacquer solvent to produce a lacquer containing approximately 35% resin solids. Such a lacquer, after baking at 400° F. for 15 minutes, results in a very flexible film.

Still another biphenol than can be used to form an intermediate phenolic resin with a dichlor ether is di(4-hydroxyphenyl)methylethylmethane, hereinafter sometimes referred to as bisphenol B. A batch composed of 121 grams (½ mol) of bisphenol B, 36 grams (¼ mol) of dichlordiethylether and 81 grams of water are brought to a boil and while being kept at a gentle boil there is slowly added thereto 20 grams of sodium hydroxide dissolved in 20 grams of water. The batch thus formed is then refluxed for 32 hours, after which the remaining sodium hydroxide is neutralized with hydrochloric acid. The resin is repeatedly washed with boiling water to remove the salt and is then dried by heat, whereupon a yield of 137 grams (98% of theoretical) of an intermediate phenolic resin, hereinafter sometimes designated as intermediate phenolic resin E, is obtained.

The 137 grams of intermediate phenolic resin E thus formed is then cut with 24 grams of hexone, and mixed with 20.5 grams of paraform and 2.7 grams of 25% dimethylamine. The batch thus formed is refluxed for 1¼ hours and then thinned with 45 grams of hexone and refluxed at reduced pressure through a separator to remove the water. It is finished at 80° C. in a vacuum of 21 inches.

A lacquer formed by dissolving this resin in hexone, to the extent of approximately about 65% solids and then further thinning it with an appropriate lacquer solvent, when applied to tin-plate and baked at 400° F. for 15 minutes provides a very flexible film.

The resins resulting from the reaction of the intermediate phenol-ether resin and an aldehyde as described in the foregoing examples are actually reaction products and are not merely mixtures of a phenol-ether resin and a phenol-aldehyde resin.

As stated above, the unsatisfied valence lines of FIGURE 2 indicate that the structure can go on indefinitely and naturally is three dimensional. In FIGURE 2, —CH$_2$— bridges are not shown at every point at which an aldehyde radical theoretically could have combined for two reasons; namely, none of the examples provides enough formaldehyde for that purpose, and secondly, practical requirements do not indicate the necessity of carrying the reaction to the greatest extent possible. Moreover, it must be understood that FIGURE 2 illustrates one heat cured bisphenol-dichloroetherformaldehyde resin made according to the present invention.

The resin of the present invention is particularly useful as a film coating for metal cans and drums. It is especially useful for coating the interior of metal cans and drums because it not only adheres tenaciously but it also provides a coating that is very flexible and will withstand bending without cracking or chipping. Moreover, it will not impart any flavor to foodstuff that comes into intimate contact with it even for long periods of time.

The resin of the present invention also is useful as an adhesive because it will adhere to many materials, such as nylon, that present difficulties in the matter of adhesion.

The invention as hereinbefore illustrated by specific examples is not limited by such examples, but can be variously embodied within the scope of the appended claims.

I claim:

1. A resin which is curable by heat to the infusible and insoluble stage, consisting of the dimethylamine catalyzed reaction product of formaldehyde with the reaction product of a bisphenol and an aliphatic dihalide reacted in a molal ratio of bisphenol to aliphatic dihalide of 2:1, the molecule of said aliphatic dihalide being characterized by having at least one ether group and having each halogen atom attached to a carbon atom in a different alkyl group, each of said alkyl groups having at least two carbon atoms and the alkyl groups being separated by the ether oxygen atom.

2. A resin which is curable by heat to the infusible and insoluble stage, consisting of the dimethylamine catalyzed reaction product of formaldehyde with the reaction product of a bisphenol and β,β' dichlorodiethylether reacted in a molal ratio of bisphenol to β,β' dichlorodiethylether of 2:1.

3. A resin which is curable by heat to the infusible and insoluble stage, consisting of the hexamethylenetetramine catalyzed reaction product of formaldehyde with the reaction product of a bisphenol and an aliphatic dihalide reacted in a molal ratio of bisphenol to aliphatic dihalide of 2:1, the molecule of said aliphatic dihalide being characterized by having at least one ether group and having each halogen atom attached to a carbon atom in a different alkyl group, each of said alkyl groups having at least two carbon atoms and the alkyl groups being separated by the ether oxygen atom.

4. A resin which is curable by heat to the infusible and insoluble stage, consisting of the hexamethylenetetramine catalyzed reaction product of formaldehyde with the reaction product of di(4-hydroxyphenyl)dimethylmethane and β,β' dichlorodiethylether reacted in a molal ratio of di(4 - hydroxyphenyl)dimethylmethane to β,β' dichlorodiethylether of 2:1.

5. A resin which is curable by heat to the infusible and insoluble stage, consisting of the dimethylamine catalyzed reaction product of formaldehyde with the reaction product of di(4-hydroxyphenyl)dimethylmethane and β,β' dichlorodiethylether reacted in a molal ratio of di-(4 - hydroxyphenyl)dimethylmethane to β,β' dichlorodiethylether of 2:1.

References Cited in the file of this patent
UNITED STATES PATENTS

| | | |
|---|---|---|
| 2,191,587 | Rothrock | Feb. 27, 1940 |
| 2,405,806 | Albrecht | Aug. 13, 1946 |
| 2,485,711 | Doelling et al. | Oct. 25, 1949 |